(12) United States Patent
Chelian

(10) Patent No.: US 10,562,432 B2
(45) Date of Patent: Feb. 18, 2020

(54) VEHICLE DOCKING AND CONTROL SYSTEMS FOR ROBOTS

(71) Applicant: Toyota Motor Engineering & Manufacturing North America, Inc., Erlanger, KY (US)

(72) Inventor: Suhas E. Chelian, San Jose, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 145 days.

(21) Appl. No.: 15/225,709

(22) Filed: Aug. 1, 2016

(65) Prior Publication Data

US 2018/0029516 A1    Feb. 1, 2018

(51) Int. Cl.
| | |
|---|---|
| *B60P 1/54* | (2006.01) |
| *B25J 11/00* | (2006.01) |
| *B25J 9/16* | (2006.01) |
| *B60J 11/00* | (2006.01) |
| *B60L 11/18* | (2006.01) |
| *B60P 1/43* | (2006.01) |
| *B60L 53/14* | (2019.01) |

(52) U.S. Cl.
CPC .......... *B60P 1/5404* (2013.01); *B25J 11/008* (2013.01); *B60L 53/14* (2019.02); *B60P 1/435* (2013.01)

(58) Field of Classification Search
CPC ......... B60P 1/5404; B60P 1/26; B60P 1/4485; B60P 1/48; B60P 1/54; B60P 1/435; B25J 9/161; B25J 11/008; B60J 11/00; B60L 11/1816
See application file for complete search history.

(56) References Cited

U.S. PATENT DOCUMENTS

| | | |
|---|---|---|
| 4,777,416 A | 10/1988 | George, II et al. |
| 7,527,282 B2 | 5/2009 | Gilbert |
| 7,896,113 B1 | 3/2011 | Ramirez |
| 7,999,506 B1 | 8/2011 | Hollar et al. |
| 8,430,192 B2 | 4/2013 | Gillett |
| 8,509,981 B2 | 8/2013 | Pfeiffer |
| 8,749,196 B2 | 6/2014 | Cohen et al. |

(Continued)

FOREIGN PATENT DOCUMENTS

WO    WO2014181083    11/2014

OTHER PUBLICATIONS

Daly et al. "Coordinated Landing of a Quadrotor on a Skid-Steered Ground Vehicle in the Presence of Time Delays"; 2011 IEEE/RSJ International Conference on Intelligent Robots and Systems; pp. 4961-4966; Sep. 2011.

(Continued)

*Primary Examiner* — Hunter B Lonsberry
*Assistant Examiner* — Mathew Franklin Gordon
(74) *Attorney, Agent, or Firm* — Snell & Wilmer LLP

(57) ABSTRACT

A vehicle for transporting and communicating with a robot includes a vehicle body and a robot dock mechanically coupled to the vehicle body and configured to mechanically couple the robot to the vehicle body. The vehicle also includes an input/output port configured to be electrically coupled to the robot. The vehicle also includes an electronic control unit (ECU) coupled to the input/output port and configured to transmit a signal to the robot via the input/output port to at least one of program the robot or control the robot.

18 Claims, 13 Drawing Sheets

(56) References Cited

U.S. PATENT DOCUMENTS

| | | | |
|---|---|---|---|
| 9,193,065 B2 | 11/2015 | Wang et al. | |
| 9,638,497 B2* | 5/2017 | Summer | F41H 11/16 |
| 2010/0034628 A1* | 2/2010 | Ray | B60R 9/065 |
| | | | 414/462 |
| 2012/0233062 A1 | 9/2012 | Cornish | |
| 2012/0286730 A1 | 11/2012 | Bonny | |
| 2013/0257145 A1* | 10/2013 | Caldeira | B60L 3/0046 |
| | | | 307/9.1 |
| 2016/0196756 A1* | 7/2016 | Prakash | B64C 39/024 |
| | | | 701/3 |
| 2016/0257401 A1* | 9/2016 | Buchmueller | B64C 39/024 |
| 2017/0129603 A1* | 5/2017 | Raptopoulos | B64C 39/024 |
| 2017/0355459 A1* | 12/2017 | Erickson | B64C 39/024 |

OTHER PUBLICATIONS

GM Europe and Segway Partner for Opel Flextreme; Sep. 2007.
Rinspeed Dock+Go; 2015.
Gao et al. "Autonomous Docking of a Smart Wheelchair for the Automated Transport and Retrieval System (ATRS)"; vol. 25, No. 4-5; pp. 203-222; Apr. 2008.

* cited by examiner

VEHICLE DOCKING AND CONTROL SYSTEMS FOR ROBOTS

BACKGROUND

1. Field

The present disclosure relates to systems and methods for docking a robot to a vehicle and, more particularly, for mechanically coupling a robot to a vehicle, providing power to the robot via a docking station, and optionally controlling the vehicle via the docking station, thus making transportation of a robot easier.

2. Description of the Related Art

Robots have been in use for many years. Initially, robots were designed to perform industrial tasks such as manufacturing. As technology has advanced, the functionality of robots has increased. The increased functionality has allowed robots to be used in more and more situations for performing a wide variety of tasks. The number and variety of robots that are available is continuing to grow, and some robots are now being used for personal tasks. For example, robots have been designed for assisting the elderly and disabled by helping with everyday tasks such as cooking, cleaning and the like.

Because robots are being designed to perform a wide variety of tasks, they can be useful in multiple locations. For example, a robot may be designed to assist an elderly person with daily tasks. It is desirable for these robots to be able to perform tasks not only inside user's houses but also outside the house, such as performing errands. It is also desirable to be able to move robots between various locations such as between a person's house and a person's work. However, many of these personal assistant robots can be relatively heavy. This relative heaviness provides difficulty in transporting the robots between locations. For example, many personal assistant robots may be too heavy for a user to lift up and place in a car, especially if the user is elderly or disabled.

Thus, there is a need for systems and methods for transporting robots between various locations.

SUMMARY

Described herein is a vehicle for transporting and communicating with a robot. The vehicle includes a vehicle body and a robot dock mechanically coupled to the vehicle body and configured to mechanically couple the robot to the vehicle body. The vehicle also includes an input/output port configured to be electrically coupled to the robot. The vehicle also includes an electronic control unit (ECU) coupled to the input/output port and configured to transmit a signal to the robot via the input/output port to at least one of program the robot or control the robot.

Also described is a docking station for docking a robot to a vehicle. The docking station includes a robot dock configured to be mechanically coupled to a vehicle body of the vehicle and to the robot. The docking station also includes a communication port coupled to the robot dock and configured to be electrically coupled to an electronic control unit (ECU) of the vehicle, to be electrically coupled to the robot and to relay a signal from the ECU to the robot to at least one of program the robot or control the robot. The docking station also includes a power port coupled to the robot dock and configured to be electrically coupled to a power source of the vehicle, to be electrically coupled to the robot and to facilitate power transfer between the power source and the robot.

Also described is a method for controlling a robot by a vehicle. The method includes receiving, by an input device of the vehicle, user input corresponding to a request for the robot to perform a mission. The method also includes programming, by an electronic control unit (ECU) of the vehicle, the robot to perform the mission. The method also includes instructing, by the ECU, the robot to begin performing the mission.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Disclosed herein are systems and methods for transporting and controlling a robot by a vehicle. The systems and methods provide several benefits and advantages such as providing a relatively easy way to transport a robot between locations. This provides benefits and advantages such as allowing a robot to be used in multiple locations with relatively little effort. Allowing the robot to be transported and used in multiple locations provides benefits and advantages such as allowing elderly or disabled persons to bring personal assistant robots along with them on errands so that the robots can help perform the errands. The systems and methods provide additional benefits and advantages such as allowing the robots to be controlled from a cabin of a vehicle. This provides additional benefits and advantages such as allowing elderly or disabled persons to control the robot without having to leave the cabin of the vehicle. This is especially useful in unpleasant weather conditions such as during rainfall or extreme temperatures.

An exemplary system includes a vehicle, a robot and a docking station. The docking station includes a robot dock for physically connecting the robot to the vehicle. The docking station also includes a power port for allowing power to transfer between the robot and the vehicle and a communication port for allowing communications to transfer between the robot and the vehicle. The vehicle includes a power source for storing or generating power, an input/output (I/O) port for transmitting and/or receiving messages and an electronic control unit (ECU). The ECU may control the power source to transmit and/or receive power from the robot. The ECU may also program and/or control the robot via the I/O port.

Figure 1:
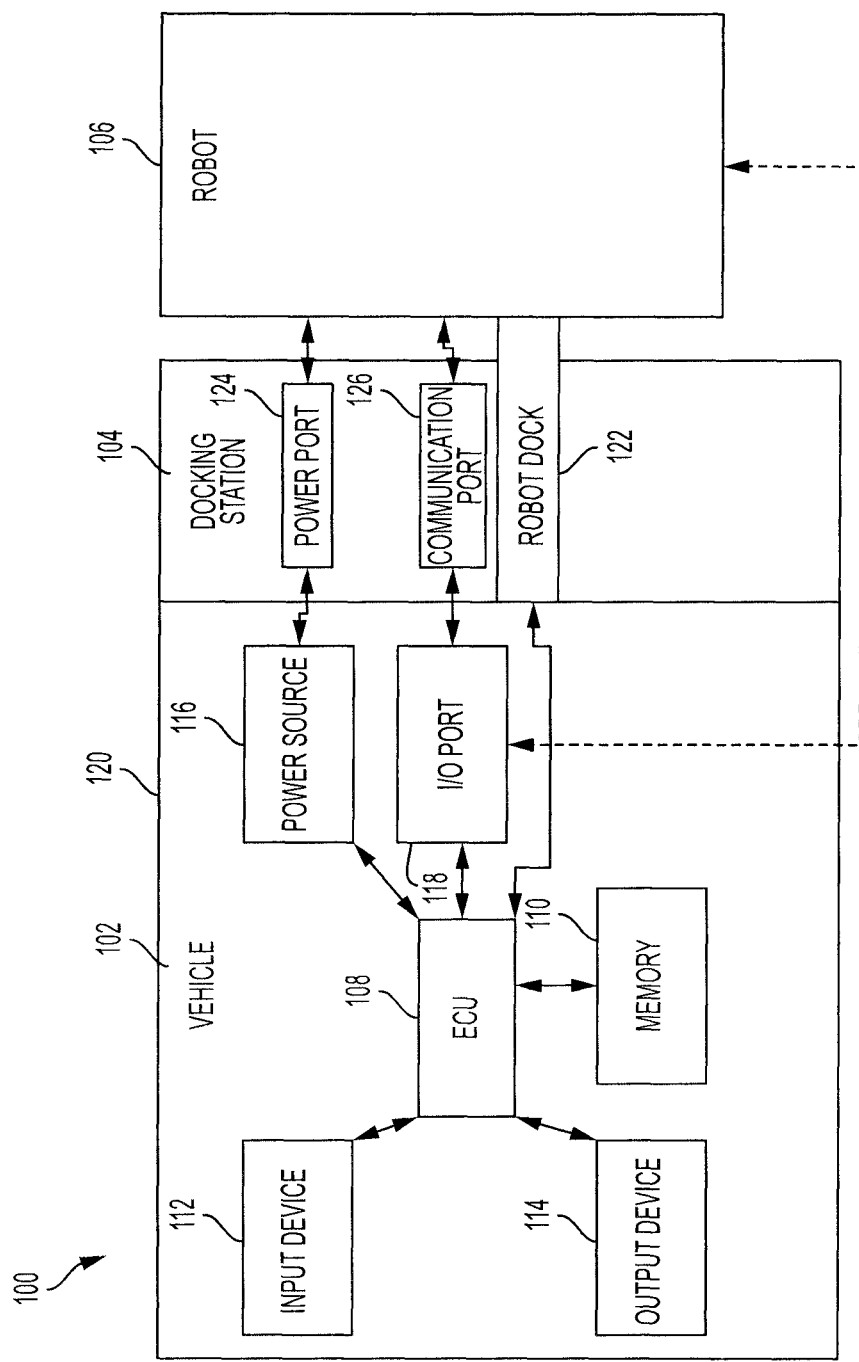
FIG. 1 is a block diagram of a system that includes a vehicle, a robot and a docking station for coupling the robot to the vehicle and allowing the vehicle to control the robot according to an embodiment of the present invention.

Referring to FIG. 1, a system 100 includes a vehicle 102, a docking station 104, and a robot 106. The docking station 104 allows the robot 106 to be mechanically and electrically connected to the vehicle 102. In that regard, the vehicle 102 may transport the robot 106, may provide power to the robot 106 and may program and/or control operations of the robot 106.

The vehicle 102 includes an ECU 108 and a memory 110. The vehicle 102 also includes an input device 112, an output device 114, a power source 116 and an I/O port 118. The vehicle 102 also includes a body 120.

The ECU 108 may be electrically coupled to some or all of the components or devices of the vehicle 102. The ECU 108 can include one or more processors or controllers specifically designed for automotive systems, and the functions of the ECU 108 can be implemented in a single ECU or in multiple ECUs. The ECU 108 may receive data from components or devices of the vehicle 102, may determine data based on the received data and may control the operations of components or devices based on the received or determined data.

The memory 110 may include one or any combination of the following: a RAM or other volatile or nonvolatile memory, a non-transitory memory or a data storage device, such as a hard disk drive, a solid state disk drive, a hybrid disk drive, a remote cloud or other appropriate data storage device or system. The memory 110 may store machine-readable instructions executable by the ECU 108 and may store any other data as instructed by the ECU 108.

The input device 112 may include any input device capable of receiving user input. For example, the input device 112 may include a button, a knob, a dial, a touchscreen, a touchpad, a microphone or the like. The input device 112 may be coupled to the ECU 108 such that the ECU 108 can receive user input via the input device 112.

The output device 114 may include any output device capable of outputting data to a user. For example, the output device 114 may include a speaker, a display, a touchscreen, a refreshable braille display or the like.

The power source 116 may include any power source capable of storing and/or generating electrical power. For example, the power source 116 may include a battery or a fuel cell for storing electrical power. The power source 116 may also or instead include a motor generator capable of converting electrical power into mechanical power and of converting mechanical power into electrical power. The power source 116 may also or instead include an engine coupled to a generator. The power source 116 may provide power for propelling the vehicle 102 and for being distributed to the robot 106. For example, the power source 116 may be directly or indirectly coupled to two or more wheels and may cause the wheels to rotate in response to receiving power from the power source 116.

The I/O port 118 may include any device or port capable of communicating with an external device or network via a wired connection and/or a wireless connection. For example, the I/O port 118 may communicate with at least one of the docking station 104 or the robot 106 via a CAN bus, 3G protocols, 4G protocols, 5G protocols, USB protocols, Bluetooth protocols, 802.11 (Wi-Fi) protocols, dedicated short range communication protocols (DSRC) or the like.

The I/O port 118 may include a physical portion and a logical portion. The physical portion may transmit and/or receive signals, for example, via an antenna or a wired connection. The logical portion may convert signals or messages between protocols, for example, from a first protocol received by the ECU 108 to a second protocol received by the robot 106.

The body 120 includes a mechanical structure that encloses and/or supports components of the vehicle 102 and/or the robot 106. The body 120 may be suspended above a ground surface by two or more tires (not shown).

The docking station 104 includes a robot dock 122, a power port 124 and a communication port 126. In some embodiments, the docking station 104 may only include one of the power port 124 or the communication port 126. The docking station 104 may be provided as a separate component from the vehicle 102 or may be included as part of the vehicle 102. For example, the docking station 104 may be sold to a user who already owns the vehicle 102 or the features of the docking station 104 may be integral to the vehicle 102.

The robot dock 122 includes a physical structure that may be mechanically coupled to the body 120 of the vehicle 102 and mechanically coupled to the robot 106. The robot dock 122 may be mechanically coupled to the body 120 and/or the robot 106 in a variety of ways, some of which will be described below.

The power port 124 may be coupled to the power source 116 of the vehicle 102. The power port 124 may also be coupled to the robot 106. In that regard, the power port 124 may receive a power signal from the power source 116 and allow the power signal to propagate to the robot 106 to charge the robot. Similarly, the power port 124 may receive a power signal from the robot 106 and allow the signal to propagate to the power source 116 to provide power to the power source 116.

The communication port 126 may be coupled to the I/O port 118 of the vehicle 102. The communication port 126 may also be coupled to the robot 106. In that regard, the communication port 126 may receive a communication signal from the I/O port 118 and allow the signal to propagate to the robot 106 and may receive a communication signal from the robot 106 and allow the signal to propagate to the I/O port 118. In some embodiments, the power port 124 and/or the communication port 126 may actively receive the signals and re-transmit the signals. In some embodiments, the I/O port 118 of the vehicle 102 may communicate directly with the robot 106 without the signal propagating through the communication port 126.

The ECU 108 may control power distribution between the power source 116 and the robot 106. For example, the ECU 108 may determine that the robot 106 has a low charge and may control the power source 116 to provide power to the robot 106 via the power port 124. Similarly, the ECU 108 may determine that the power source 116, such as a battery, has a low charge and, in response, may control the power source 116 to receive power from the robot 106 via the power port 124.

The ECU 108 may program and/or control the robot 106 via the communication port 126. For example, a user may provide input data corresponding to a desired mission of the robot 106 using the input device 112. The ECU 108 may receive the desired mission and may program the robot 106 to perform the desired mission.

In some embodiments, the robot dock 122 may have controllable components such as actuators for connecting and disconnecting the robot 106 from the robot dock 122. In that regard, the ECU 108 may control the robot dock 122 to connect to the robot 106 and to disconnect from the robot 106.

Figure 2:
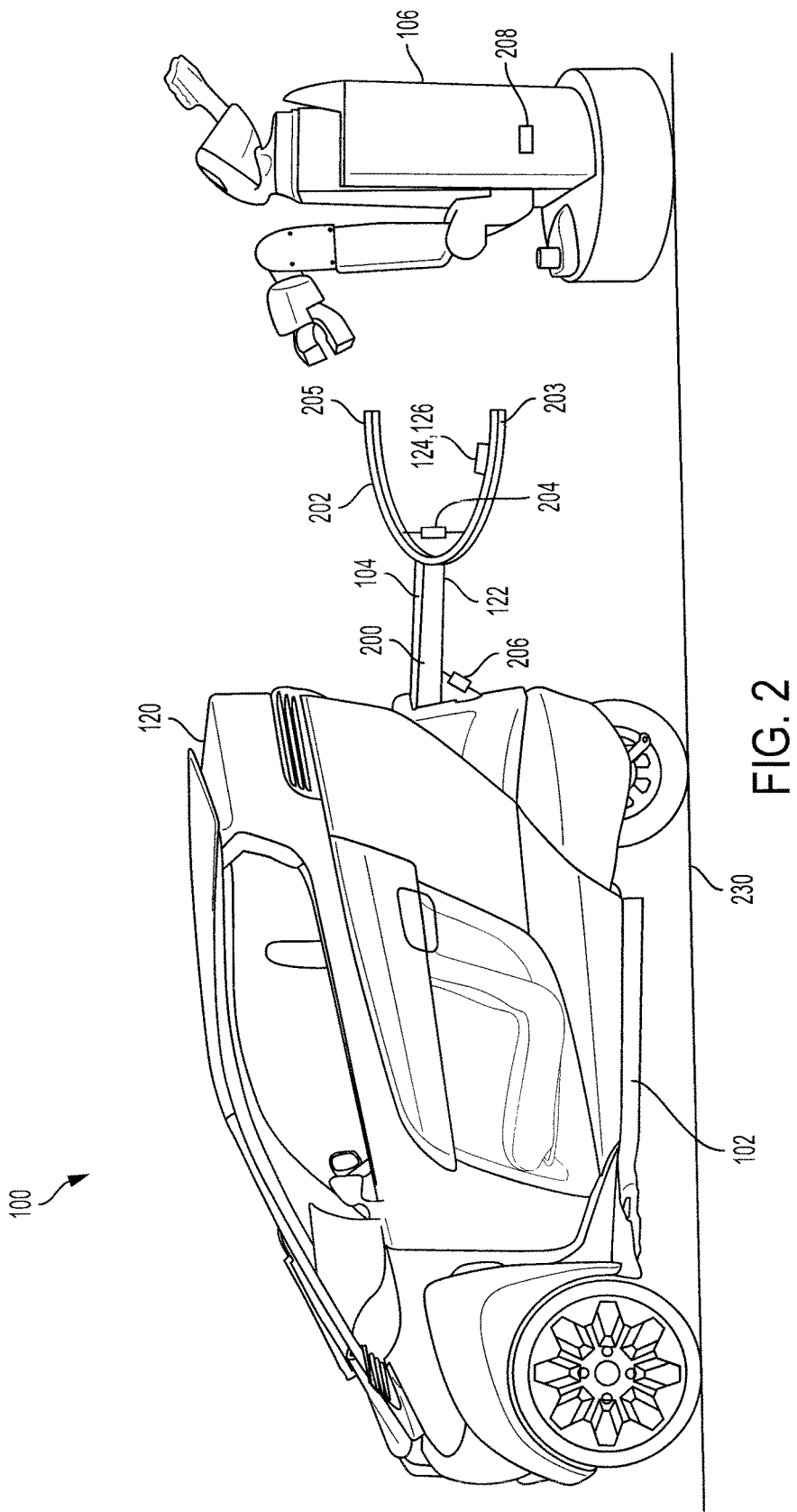
FIG. 2 is a drawing of the system of FIG. 1 where the docking station includes a pincher for grasping the robot according to an embodiment of the present invention.

Turning now to FIG. 2, the docking station 104 may include the robot dock 122 and a combined power port/communication port 124, 126. In some embodiments, the power port 124 and the communication port 126 may be included as a single port, as shown in FIG. 2. In some embodiments, the power port 124 and the communication port 126 may be separate ports.

The robot dock 122 may include an arm 200, a pincher 202, a first actuator 204, and a second actuator 206. The arm 200 may be mechanically coupled to the body 120 of the vehicle 102. For example, the arm 200 may be coupled to a trailer hitch of the body 120, may be bolted to the body 120, may be welded to the body 120 or may be coupled to the body 120 in another manner.

Figure 5:
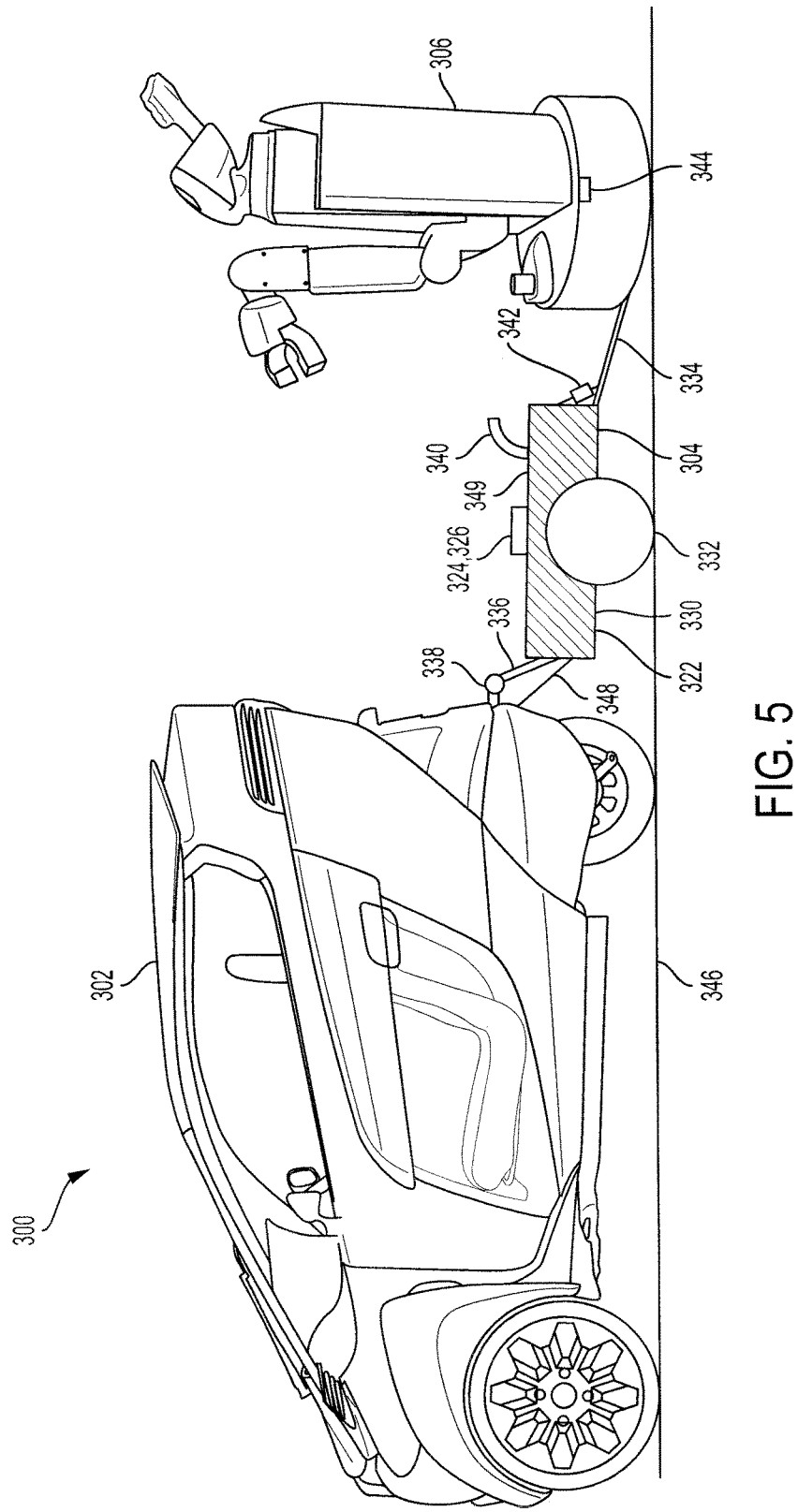
FIG. 5 is a drawing of another system including a vehicle, a robot and a docking station that includes a trailer according to an embodiment of the present invention.
Figure 6:
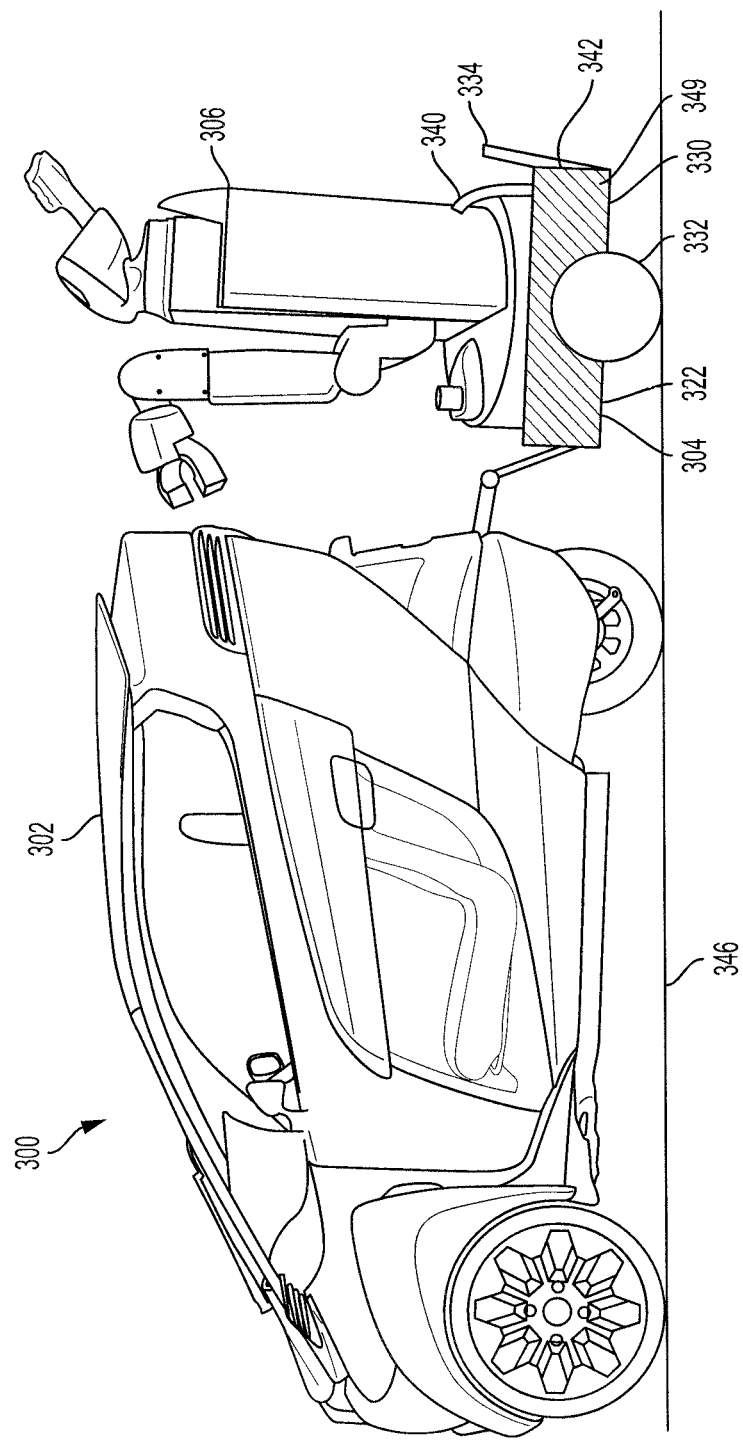
FIG. 6 is a drawing of the system of FIG. 5 showing the robot being docked to the trailer according to an embodiment of the present invention.

In some embodiments, the robot dock 122 may also include a lock, for example, positioned on the arm 200 of the robot dock 122. The lock may include any locking mechanism capable of being connected to the robot 106 and resisting separation of the robot 106 from the trailer robot dock 122. For example, the lock may be locked and unlocked by use of a physical or electric key, by entering a code or combination, by a control signal sent from the ECU 108 of the vehicle 102 or the like. An exemplary lock 340 is illustrated in FIGS. 5 and 6.

Figure 7:
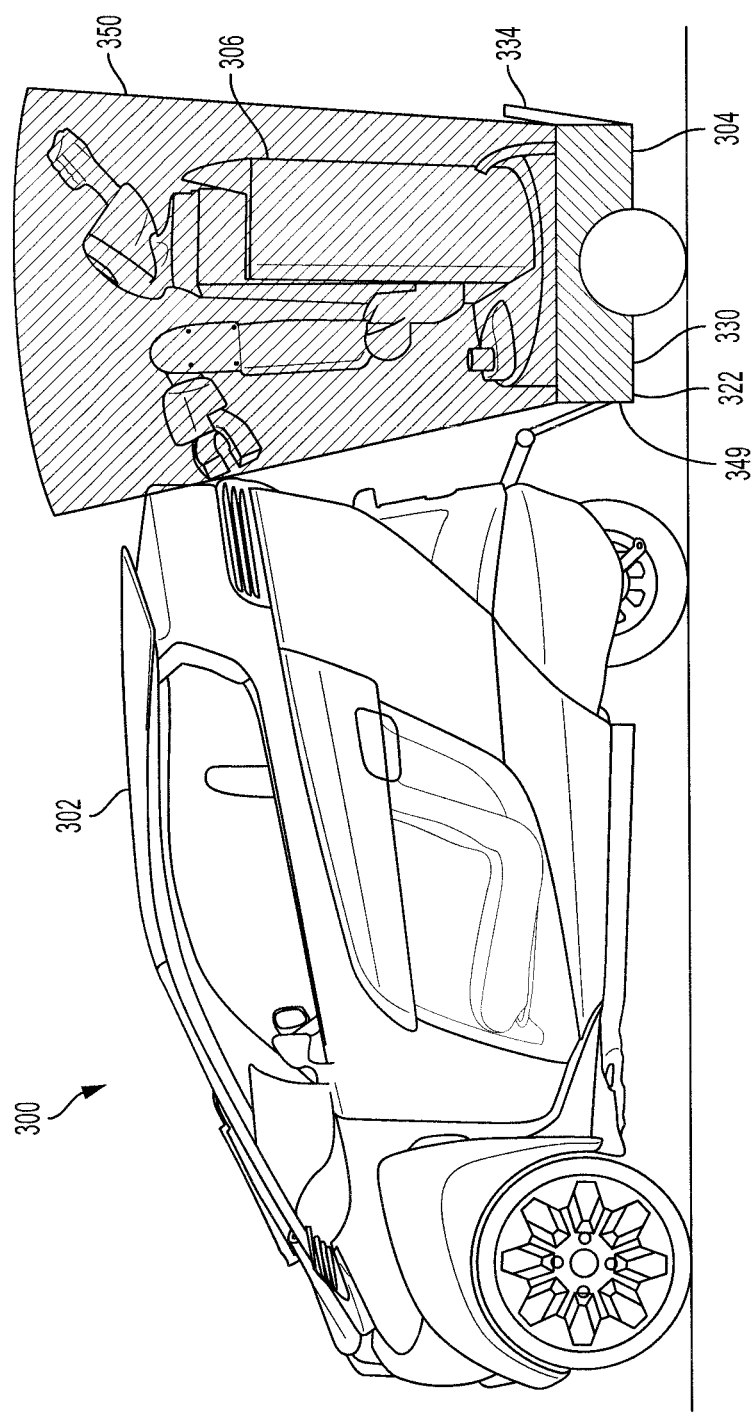
FIG. 7 is a drawing of the system of FIG. 5 showing a convertible cover of the docking station for surrounding at least a portion of the robot according to an embodiment of the present invention.

In some embodiments, the robot dock 122 and/or the vehicle 102 may also include a cover. An exemplary convertible cover 350 is shown in FIG. 7. The cover may be coupled to any portion of the robot dock 122 and/or the vehicle 102, such as to the arm 200 or to another arm (not shown). The cover may have a storage position in which the robot 306 is allowed to freely move into and out of the robot dock 122. The cover may be movable to a covered position in which it surrounds at least a portion of the robot 106. The cover may be controlled by the ECU 108 of the vehicle 102 and/or may be manually moved between the storage position and the covered position.

The first actuator 204 may be positioned between a first finger 203 and a second finger 205 of the pincher 202. The first actuator 204 may actuate the pincher 202 between an uncoupled position, as shown in FIG. 2, and a coupled position. When the pincher 202 is in the uncoupled position, the robot 106 may freely move into and out of an area defined between the fingers 203, 205. For example, the robot 106 may roll or walk towards the pincher 202 such that at least a portion of the robot 106 is positioned between the fingers 203, 205.

Figure 3:
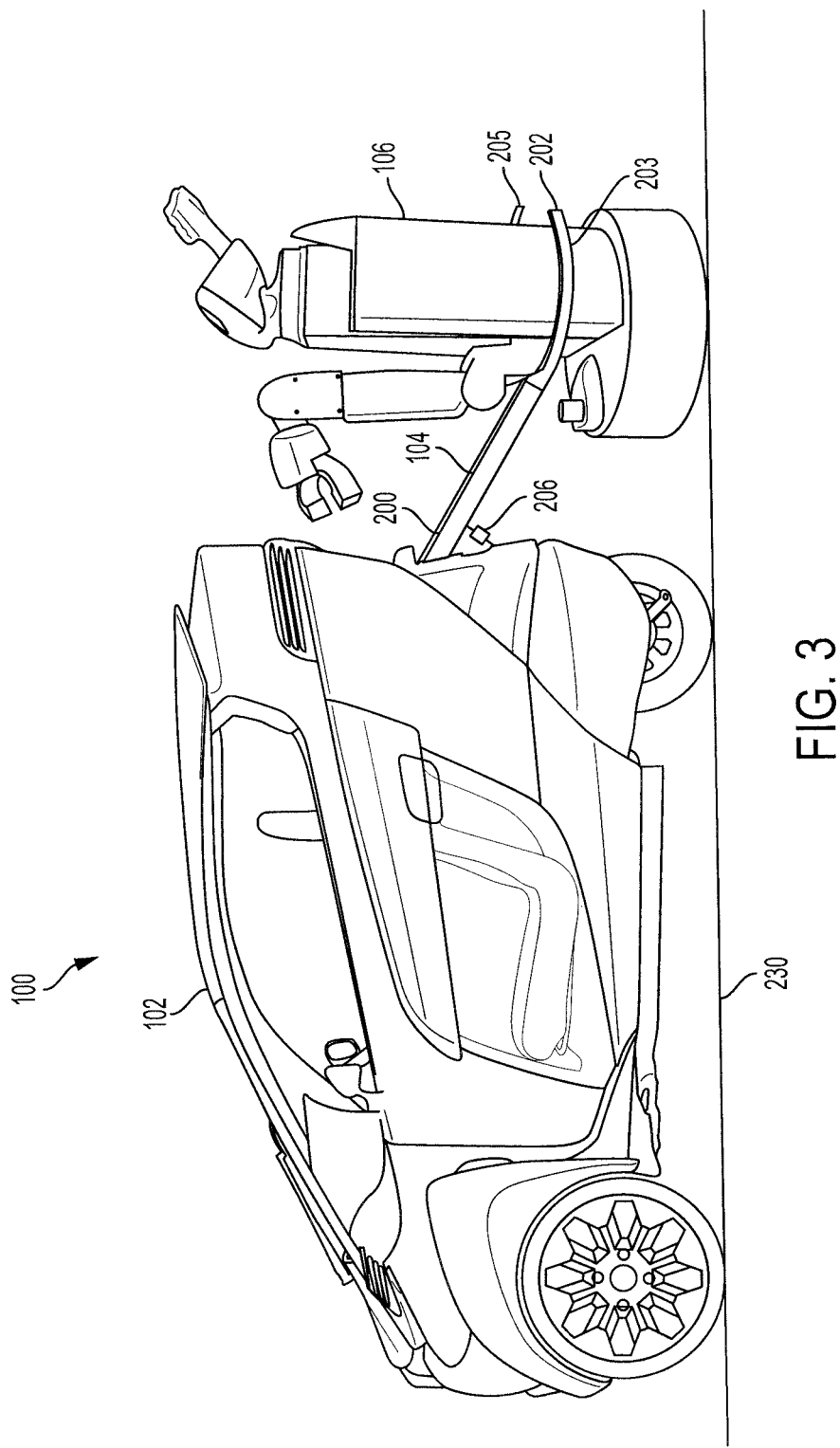
FIG. 3 is a drawing of the system shown in FIG. 2 showing the robot being grasped by the pincher according to an embodiment of the present invention.

With brief reference now to FIG. 3, the pincher 202 is shown in the coupled position about the robot 106. In order to actuate the pincher 202 from the uncoupled position to the coupled position, the first actuator 204 may contract, causing the fingers 203, 205 of the pincher 202 to move closer together. When this happens and the robot is within the fingers 203, 205 of the pincher 202, the fingers 203, 205 may close around a portion of the robot 106. When in this state, the fingers 203, 205 resist separation of the robot 106 from the pincher 202.

Returning reference to FIG. 2, the power port/communication port 124, 126 may be positioned on the finger 203. The robot 106 may include a connector 208 designed to connect to the power port/communication port 124, 126 of the docking station 104. For example, when the first actuator 204 contracts, the power port/communication port 124, 126 may be received by the connector 208 of the robot 106. When the power port/communication port 124, 126 is received by the connector 208, power and/or communications may be transmitted between the vehicle 102 and the robot 106.

In some embodiments, the docking station 104 may include a separate power port and a communication port and the robot 106 may also include a separate power port and a communication port. In that regard, power may transfer between the docking station 104 and the robot 106 via the power port and communications may transfer between the docking station 104 and the robot 106 via the separate communication port.

The second actuator 206 may be coupled between the body 120 of the vehicle 102 and the arm 200. The second actuator 206 may move the arm 200 between a lifted position, as shown in FIG. 2, and a grounded position. In order to move the arm from the lifted position to the grounded position, the second actuator 206 may become compressed. As the second actuator 206 is compressed, the end of the arm 200 connected to the pincher 202 moves towards a ground surface 230.

Figure 4:
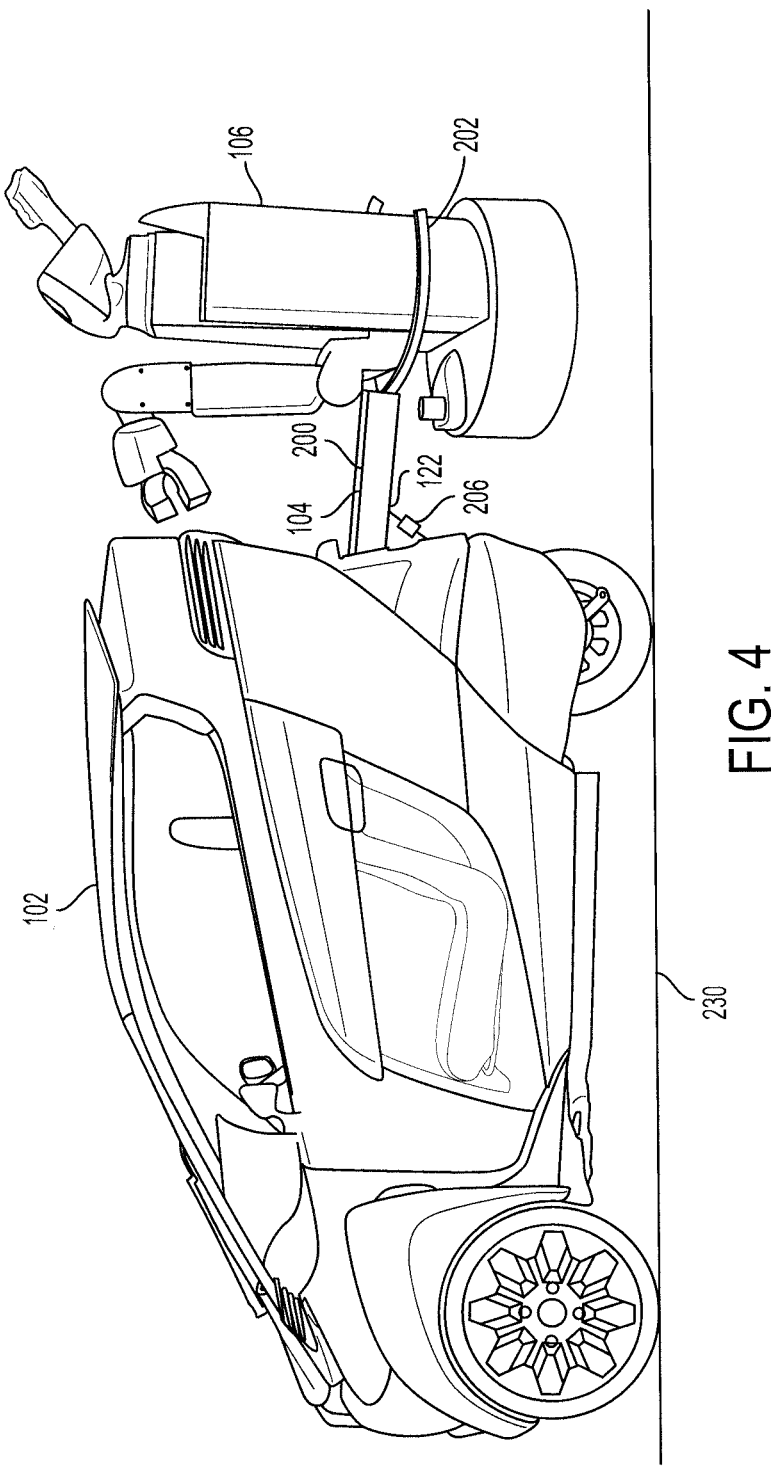
FIG. 4 is a drawing of the system shown in FIG. 2 showing the docking station lifting the robot above the ground surface according to an embodiment of the present invention.

Referring now to FIGS. 2 and 3, when the arm 200 is in the grounded position and the robot 106 is coupled to the robot dock 122 (i.e., the pincher 202 is in the coupled position about the robot 106), a bottom of the robot 106 may contact the ground surface 230. Referring now to FIGS. 3 and 4, the second actuator 206 has moved the arm 200 from the grounded position to the lifted position in FIG. 4. When the robot 106 is coupled to the robot dock 122 and the second actuator 206 has actuated the armed 200 to the lifted position, a bottom of the robot 106 may be above the ground surface 230 and, thus, not contact the ground surface 230. When in this state, the vehicle 102 may drive along the ground surface 230 and safely transport the robot 106 without causing harm to the robot 106.

Referring to FIGS. 1-4, when the ECU 108 of the vehicle 102 determines that the robot 106 should begin performing a mission, the ECU 108 may cause the second actuator 206 to move the arm 200 to the grounded position. When the robot 106 is in contact with the ground surface 230, the ECU 108 may cause the first actuator 204 to actuate the pincher 202 to the uncoupled position. After the robot 106 is in contact with the ground surface 230 and the pincher 202 is in the uncoupled position, the robot 106 may freely move away from the vehicle 102 and begin performing its mission.

Turning now to FIG. 5, another system 300 includes a vehicle 302, a docking station 304 and a robot 306. The vehicle 302 may have similar features as the vehicle 102 of FIG. 2 and the robot 306 may have similar features as the robot 106 of FIG. 2.

The docking station 304 includes a trailer 322 as the robot dock and also includes a power port/communication port 324, 326. The docking station 304 further includes a cable 348 coupled to the power port/communication port 324, 326 and designed to be coupled to an input/output port (not shown) of the vehicle 302. In some embodiments, the docking station 304 may be electrically coupled to the vehicle 302 in any other fashion.

The trailer 322 includes a hitch connector 336 that is designed to be attached to a trailer hitch 338 of the vehicle 302. In that regard, the docking station 304 can be electrically coupled to the ECU of the vehicle 302 via the cable 348 and can be mechanically coupled to the vehicle 302 via the hitch connector 336 and the trailer hitch 338. The docking station 304 can also be separated from the vehicle 302 by disconnecting the cable 348 from the vehicle 302 and by disconnecting the hitch connector 336 from the trailer hitch 338. In that regard, the docking station 304 may be stored separately from the vehicle 302 and may be coupled to the vehicle 302 when desired.

The robot 306 includes a connector 344 that is designed to be connected to the power port/communication port 324, 326. When the power port/communication port 324, 326 is connected to the connector 344 of the robot 306, power and/or communications may transfer between the docking station 304 and the robot 306. Furthermore, when the cable 348 is connected to the vehicle 302, power and/or communications may be transmitted between the vehicle 302 and the robot 306 via the docking station 304.

The power port/communication port 324, 326 and the connector 344 of the robot 306 may include various types of connectors. For example, the power port/communication port 324, 326 and the connector 344 may be coupled together via a cable and one or more physical connectors. In some embodiments, the power port/communication port 324, 326 and the connector 344 may be directly coupled via one or more physical connectors.

In some embodiments, the power port/communication port 324, 326 may transmit power and/or communications to the robot 306 wirelessly. For example, the power portion of the power port/communication port 324, 326 may be designed to transmit and/or receive an inductive charge and the connector 344 of the robot 306 may be designed to receive and/or transmit an inductive charge.

The trailer 322 includes a platform 330, a wheel 332 and a ramp 334. The wheel 332 is coupled to the platform 330 and supports the platform 330 above a ground surface 346. When the hitch connector 336 of the trailer 322 is coupled to the trailer hitch 338 of the vehicle 302, the wheel 332 may rotate as the vehicle 302 moves, allowing the trailer 322 to move along the ground surface 346 along with the vehicle 302.

The trailer 322 may be designed such that the platform 330 can support the robot 306 above the ground surface 346. Thus, when the robot 306 is positioned on the platform 330, the vehicle 302 may transport the robot 306 between various locations.

The trailer 322 may include one or more sides 349 extending from the platform 330 in a direction away from the ground surface 346. The one or more sides 349 may be positioned proximate to the robot 306 when the robot 306 is positioned on the platform 330. For example, the one or more sides 349 may be positioned within 1 foot of the robot 306, within half a foot of the robot 306, within 3 inches of the robot 306, may be in contact with the robot 306 or the like. In that regard, the sides 349 may contact the robot 306 when the robot 306 moves relative to the trailer 322, thus reducing the likelihood of the robot 306 falling off of the platform 330.

The ramp 334 may have a first end coupled to the platform 330 and may include a second end. The ramp 334 may be positioned in a loading position as shown in FIG. 5. When the ramp 334 is in the loading position, the second end of the ramp 334 may contact the ground surface 346. This provides a surface upon which the robot 306 may roll, walk, or otherwise move from a location on the ground surface 346 to a location on the platform 330.

In some embodiments, the trailer 322 may include an actuator 342 coupled to the ramp 334 and one or more of the sides 349 or the platform 330. The actuator 342 may move the ramp 334 from the loading position to a storage position. In some embodiments, the trailer 322 may not include an actuator and the ramp 334 may be manually moved between the loading position and the storage position.

Turning now to FIG. 6, the ramp 334 is positioned in the storage position. When the ramp 334 is in the storage position, the second end of the ramp 334 is moved away from the ground surface 346 and held in the position away from the ground surface 346. For example, the ramp 334 may be latched or otherwise coupled to one or more of the sides 349 or the platform 330.

Referring briefly to FIGS. 5 and 6, the trailer 322 may also include a lock 340. The lock 340 may include any locking mechanism capable of being connected to the robot 306 and resisting separation of the robot 306 from the trailer 322. For example, the lock may be locked and unlocked by use of a physical or electric key, by entering a code or combination, by a control signal sent from the ECU of the vehicle 302 or the like. The vehicle 302 may include an input device for receiving an identifier of a user. The identifier may include a character string, a fob, a biometric or the like. The ECU of the vehicle 302 may receive the identifier via the input device. Upon determining that the robot 306 should be locked to, or unlocked from, the trailer 322, the ECU may control the lock 340 to switch from the locked state to the unlocked state or vice versa so long as the identifier corresponds to an authorized user.

The lock 340 may be coupled to the robot 306 in various manners. For example, the lock 340 may include a chain that extends through an aperture of the robot 306. The lock 340 may also or instead include a mechanism that can be inserted into a cavity of the robot 306 and expanded such that it cannot be removed from the cavity while locked. Because the robot 306 may not be fully enclosed by the trailer 322, the lock 340 may reduce the likelihood of the robot 306 being removed from the trailer 322 by an unauthorized person.

Turning to FIG. 7, the docking station 304 may also include a convertible cover 350. The convertible cover 350 may be coupled to one or more of the sides 349, the platform 330 or the ramp 334. The convertible cover 350 may have a storage position in which it is compressed in such a way as to allow the robot 306 to be loaded onto the trailer 322. For example, when compressed, the convertible cover 350 may be located substantially within an area defined by the sides 349 of the trailer 322. The convertible cover 350 may be controlled to be in a covered position in which it is expanded and surrounds at least a portion of the robot 306, as shown in FIG. 7. The convertible cover 350 may be controlled by the ECU of the vehicle 302 and/or may be manually moved between the storage position and the covered position.

The convertible cover 350 may include any material such as plastic, glass, fabric, metal or the like. For example, the convertible cover 350 may include a metal skeleton and a fabric skin.

Figure 8:
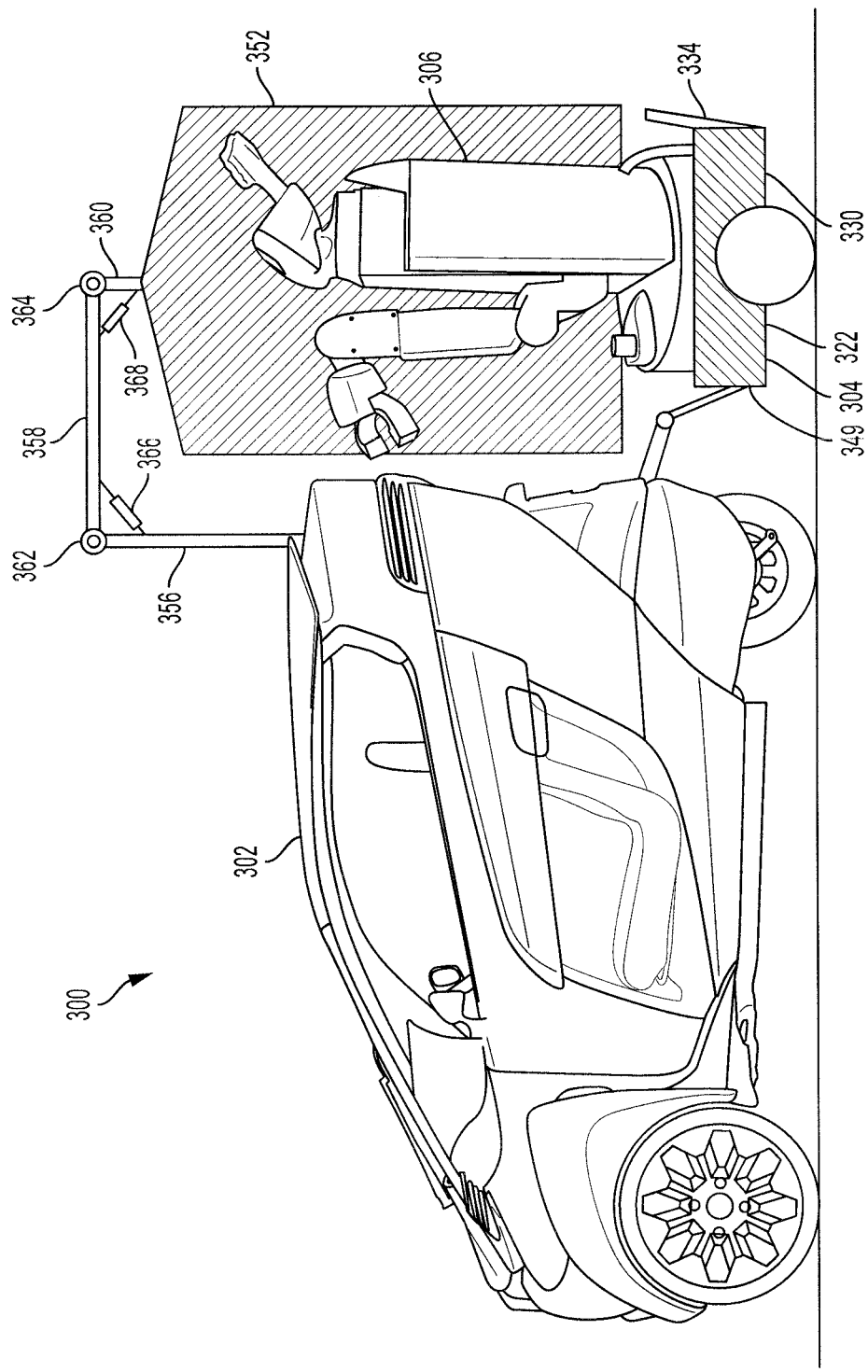
FIG. 8 is a drawing of the system of FIG. 5 showing a movable cover of the docking station for covering at least a portion of the robot according to an embodiment of the present invention.

Turning to FIG. 8, the vehicle 302 or the docking station 304 may include a movable cover 352. The movable cover 352 may be coupled to the vehicle 302 or the docking station 304 via one or more posts. For example, the movable cover 352 is coupled to the vehicle 302 by a first post 356, a second post 358 and a third post 360. The first post 356 and the second post 358 are coupled together by a joint 362, and the second post 358 and the third post 360 are coupled together by a joint 364. The joints 362, 364 allow relative movement of the posts 356, 358, 360.

The posts 356, 358, 360 may be manipulated to move the movable cover 352 from a covered position, as shown in FIG. 8, to an uncovered position where the movable cover 352 may not surround the robot 306. The movable cover 352 may be positioned in the covered position in order to protect at least a portion of the robot 306 from weather elements such as direct sunlight and/or rain. The movable cover 352 may also protect the robot 306 from theft. The movable cover 352 may include any material such as plastic, glass, fabric, metal or the like.

The actuators 366, 368 may be used to electronically control the position of the movable cover 352. For example, the actuator 366 may be coupled between the first post 356 and the second post 358 and may be controlled to move the second post 358 relative to the first post 356. Similarly, the actuator 368 may be coupled between the second post 358 and the third post 360 and may be controlled to move the third post 360 relative to the second post 358. In that regard, the ECU may control the actuators 366, 368 to move the movable cover 352 between the covered position and the uncovered position. For example, the ECU may control the actuators 366, 368 to cause the movable cover 352 to be in the open position in response to receiving user input corresponding to a request to the robot 306 to leave the docking station 304 and/or in response to determining that the robot 306 should depart the docking station 304.

When the docking station 304 is not coupled to the vehicle 302, the movable cover 352 may remain coupled to the vehicle 302 or may be disconnected from the vehicle 302. In some embodiments, the movable cover 352 may be disconnected from one or more of the posts 356, 358, 360 and, in some embodiments, one or more of the posts 356, 358, 360 may be disconnected from the vehicle 302.

Figure 9:
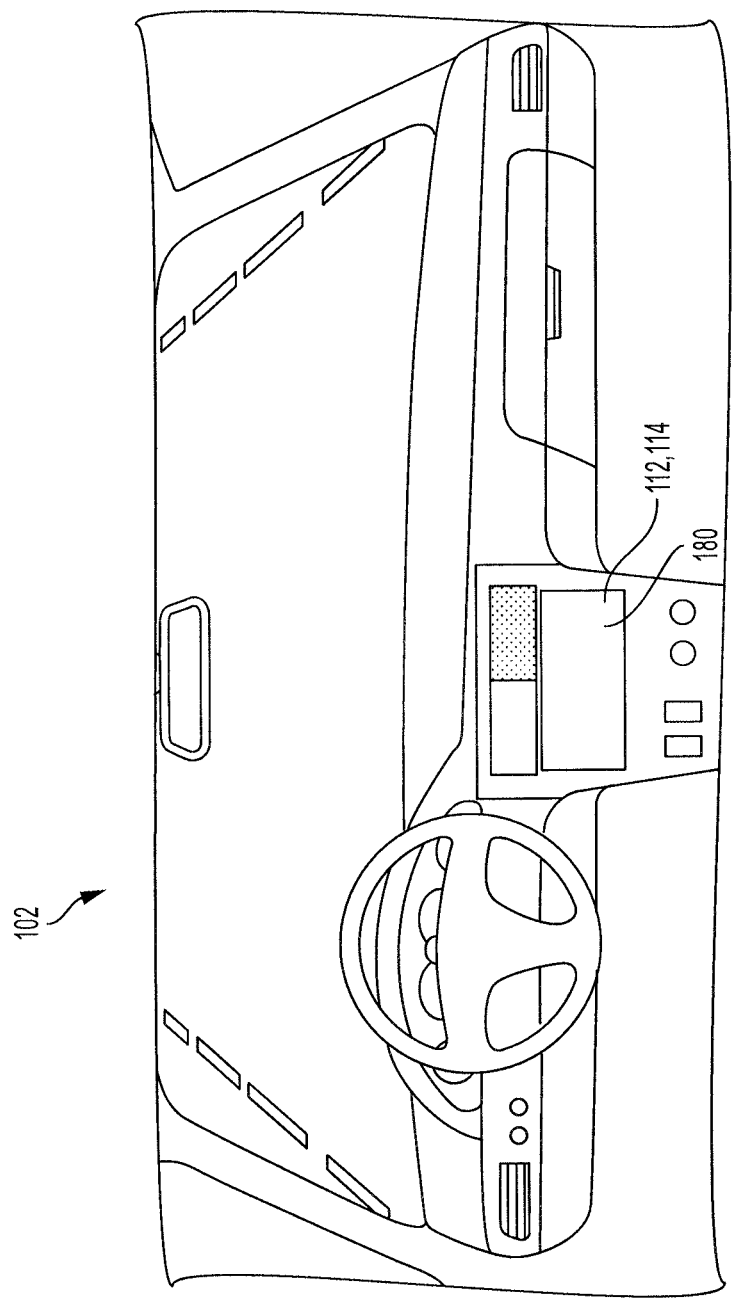
FIG. 9 is a drawing of an interior of the vehicle of FIG. 1 including a touchscreen according to an embodiment of the present invention.

Turning to FIG. 9, a view of a cabin of the vehicle 102 is shown. The vehicle 102 includes a touchscreen 180 that performs the functions of the input device 112 and the output device 114.

Figure 10:
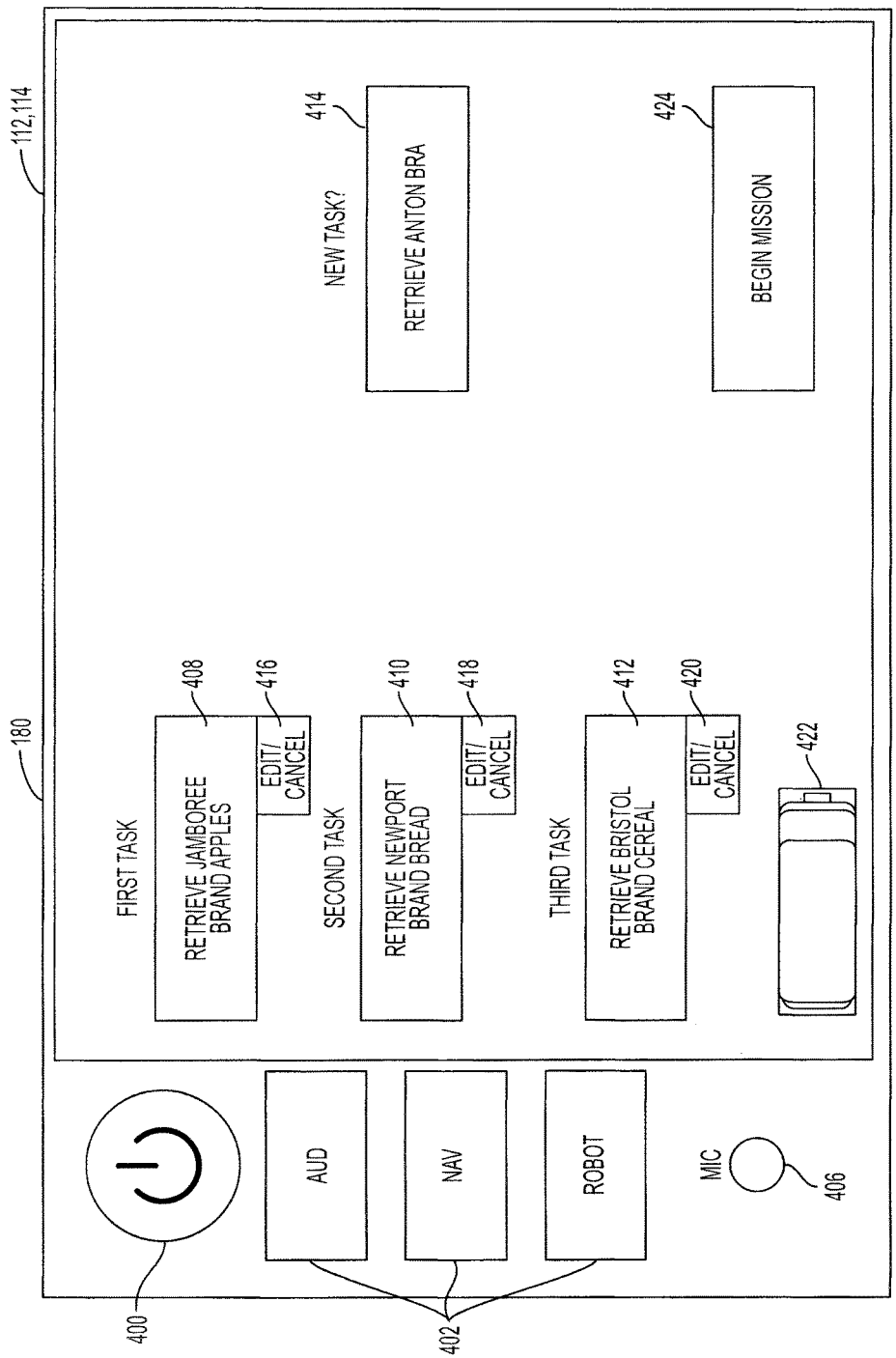
FIG. 10 is a drawing of the touchscreen shown in FIG. 9 illustrating various options for programming a robot while the robot is attached to a docking station according to an embodiment of the present invention.

Referring to FIGS. 1 and 10, another view of the touchscreen 180 illustrates features that can be performed using the system 100. The touchscreen 180 includes several options for receiving user input. For example, the touchscreen 180 includes a power button 400, mode select buttons 402, a microphone 406 and a new task 414 for receiving user input corresponding to a new task to be performed by the robot 106.

The touchscreen 180 also provides information corresponding to the robot 106 such as currently scheduled tasks 408, 410 and 412 and a current battery status 422 of the robot 106. The tasks shown in FIG. 10 may correspond to a mission of the robot 106 that include tasks related to entering a grocery store and retrieving groceries. As shown, the mission currently includes a first task 408 to retrieve Jamboree brand apples, a second task to retrieve Newport brand bread and a third task to retrieve Bristol brand cereal. The touchscreen 180 provides an option for a user to edit or cancel each of the assigned tasks. For example, the touchscreen 180 provides an edit/cancel button 416 corresponding to the first task 408, an edit/cancel button 418 corresponding to the second task 410 and an edit/cancel button 420 corresponding to the third task 412. As shown, a user is in the process of requesting the new task 414.

In some embodiments, a user may provide input to the touchscreen 180 using a keypad or a displayed keyboard to type in the desired input. In some embodiments, a user may provide input by speaking a command into the microphone 406. Input may be provided in any other manner as known in the art, such as direct teleoperation of joints, positions, or the like.

The screen displayed in FIG. 10 may correspond to a situation where the robot 106 is being programmed prior to beginning the mission. The user may provide one or more tasks to be performed during the mission via the touchscreen 180. The ECU 108 may receive the desired tasks and may program the robot 106 accordingly. After all tasks have been input by the user, the user may select a begin mission button 424 corresponding to a request for the robot to begin performing the tasks of the mission.

Figure 11:
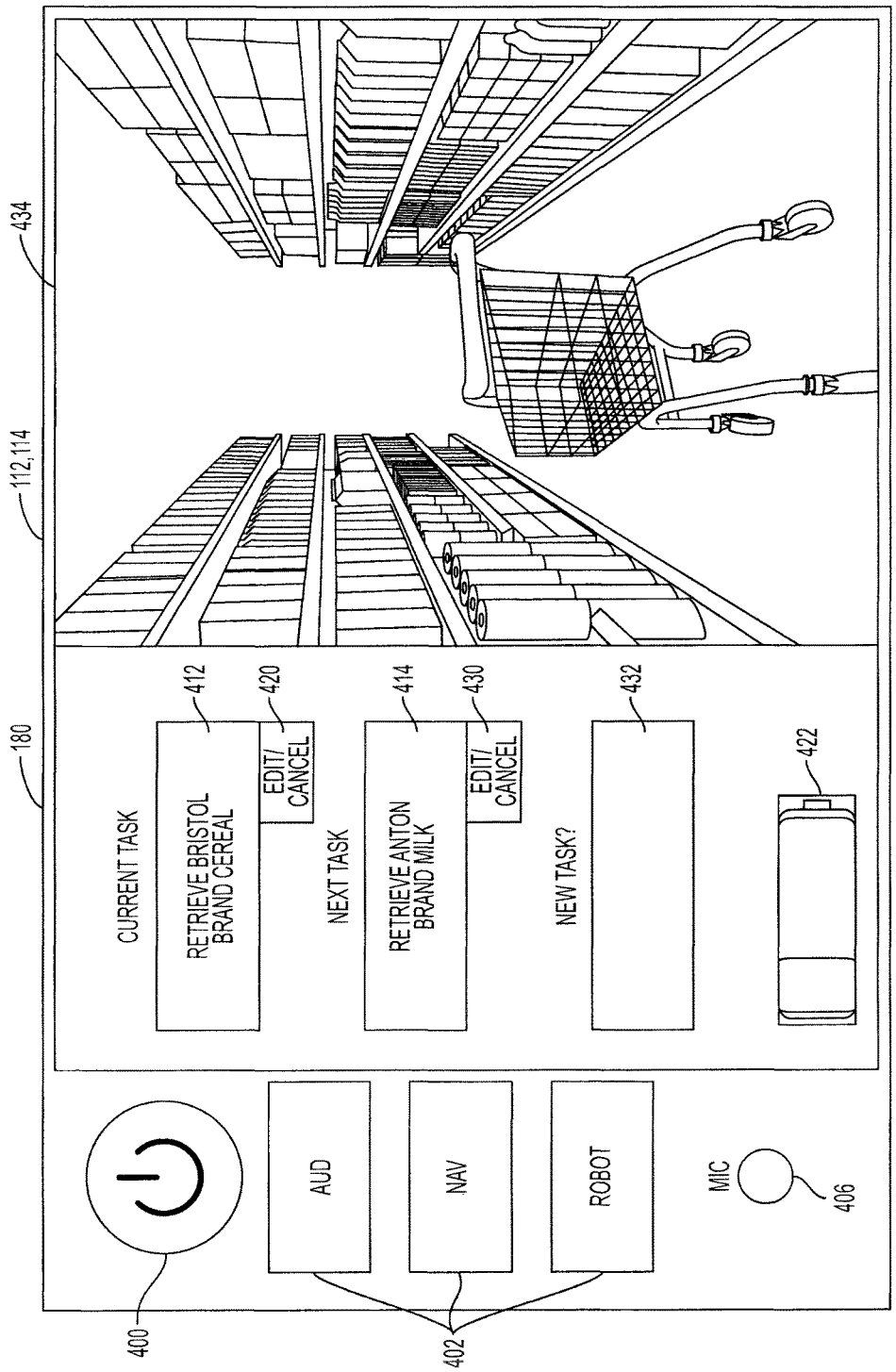
FIG. 11 is a drawing of the touchscreen shown in FIG. 9 illustrating various options for controlling a robot while the robot is attached to a docking station according to an embodiment of the present invention.

Referring now to FIGS. 1 and 11, once the robot 106 has begun the mission, the touchscreen 180 may display data 434 corresponding to a current status of the robot 106. For example, the data 434 displayed by the touchscreen 180 may correspond to a current view of the robot 106. Additionally, the touchscreen 180 may remove tasks from the task list as they are performed. For example, as the current task 412 includes retrieving Bristol brand cereal and the new task 414 includes retrieving Anton brand milk, the user may determine that the first task 408 and the second task 410 shown in FIG. 10 have been performed as they are no longer shown in the task list.

The touchscreen 180 may also provide the edit/cancel button 420 to allow the user to select to edit or cancel the third task 412, an edit/cancel button 430 to allow the user to select to edit or cancel the new task 414 and a new task field 432 for allowing a user to add a task to the current mission. Thus, the user may monitor the status of the mission of the robot 106 and may change the mission of the robot 106 while the robot 106 is undocked from the docking station 104 via the touchscreen 180. The touchscreen 180 may also display at least one of an estimated time for completion or an estimated energy usage for each task. The touchscreen 180 may also provide alternatives to a user, such as suggesting Birmingham brand cereal if Bristol brand cereal is unavailable or if Birmingham brand cereal is on sale.

Figure 12:
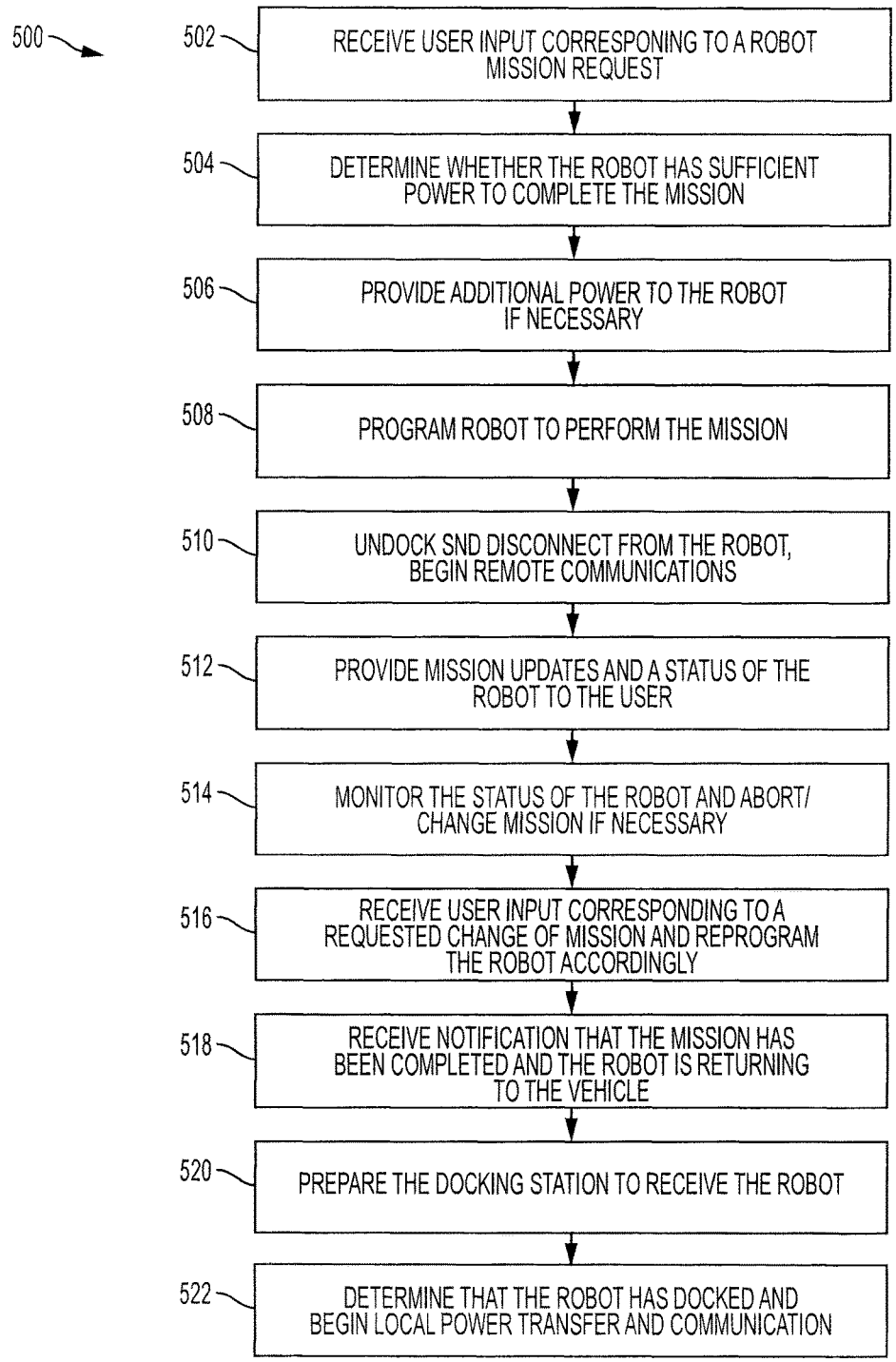
FIG. 12 is a flowchart illustrating a method for controlling a robot by a vehicle according to an embodiment of the present invention.
Figure 13:
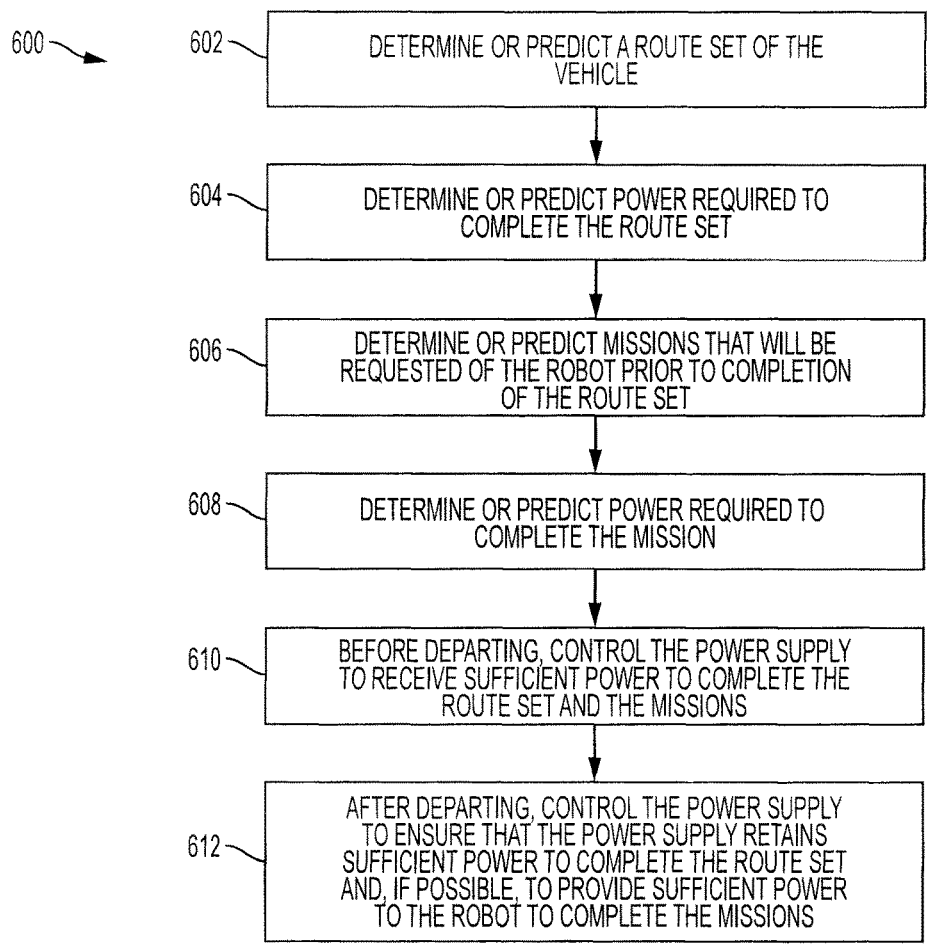
FIG. 13 is a flowchart illustrating a method for controlling power transfer between a vehicle and a robot according to an embodiment of the present invention.

Turning to FIG. 12, a method 500 for controlling a robot, such as the robot 106 of FIG. 1, using a vehicle, such as the vehicle 102 of FIG. 1, is shown. The method 500 may be performed, for example, by an ECU of the vehicle 102. In block 502, the ECU may receive, via an input device of the vehicle, user input corresponding to a request for the robot to perform a mission. For example, the user input may include one or more requested tasks to be completed during the mission. In some embodiments, the user input may correspond to a selection of a predetermined task of the robot. For example, the robot may be preprogrammed to perform certain missions. The user may select one or more of the missions and request that the robot perform the selected mission(s).

In block 504, the ECU may determine whether the robot has sufficient power to complete the mission. For example, the ECU may first predict or determine an amount of power that the robot will require to perform the mission. The ECU may predict or determine the required amount of power based on the tasks to be performed during the mission and based on power usage statistics of the robot. For example, if the robot uses half of a kilowatt-hour (kWH) per five minutes and the mission will require 30 minutes to complete, the ECU may predict that the robot will require 3 kWH of power to complete the mission. In some embodiments, the ECU may be designed to predict that the mission will require more power than is likely to be used. For example, the ECU may be designed to predict that any given mission will require ten percent (10%) more, or 15% more, or 25% more power than it is likely to use during the mission.

After predicting or determining the amount of power that the robot will use to perform the mission, the ECU may compare the predicted or determined amount of power to the current power level of the robot. If the predicted or determined amount of power to be used during the mission is less than the current power level of the robot, the ECU may determine that the robot requires additional power to complete the mission.

In block 506, if the ECU determines that the robot requires additional power to complete the mission, the ECU may control a power source of the vehicle to provide power to the robot. For example, the ECU may control a battery of the vehicle to provide electrical power to the robot via a power port of the docking station. As another example, the ECU may control an engine of a vehicle to generate mechanical power and a generator to convert the mechanical power into electrical power to be provided to the robot via the power port of the docking station.

In block 508, the ECU may program the robot to perform the mission. In some embodiments, the ECU may provide tasks to the robot in the same format that they are received via the input device. In some embodiments, the ECU may convert or break down the tasks into a different protocol or smaller tasks and provide the converted task data to the robot. For example, a user may provide the task of retrieving Bristol brand cereal from the grocery store. The ECU may determine which lower-level tasks must be completed in order to complete the task of retrieving the Bristol brand cereal. For example, the ECU may determine that the robot must first be undocked from the docking station, must then proceed 50 feet away from the docking station to arrive at the door of the grocery store, etc. The ECU may then program the robot to complete these lower level tasks.

Once the robot has been programmed with all tasks of the mission, the ECU may determine when the robot should be undocked from the docking station and begin performing the mission. For example, the ECU may determine that the robot should begin the mission when the vehicle arrives at the destination, such as a parking lot of the grocery store.

In some embodiments, the ECU may determine that the robot should begin the mission when the ECU determines that the vehicle is parked at a location that is within a predetermined distance of the destination. For example, the destination may be the grocery store and the ECU may determine that the robot should begin the mission when its vehicle is parked at a location within 500 feet of the grocery store. In some embodiments, the ECU may determine that the robot should begin the mission in response to receiving user input corresponding to a request for the mission to begin. When the ECU determines that the robot should begin the mission, the ECU may control the docking station to undock and disconnect from the robot in block 510. In some embodiments, if the vehicle is capable of communicating with the robot wirelessly, the ECU may also establish wireless communications with the robot at or about the time of undocking.

When controlling the docking station to undock and disconnect from the robot, the ECU may control, for example, an actuator coupled to two fingers of a pincher to move from the coupled position to the uncoupled position to allow the robot to separate from the pincher. As another example, the ECU may control an actuator coupled to a ramp of a trailer to be moved to a loading position, also allowing the robot to separate from the trailer. After the robot has undocked from the docking station, the ECU may or may not control the docking station to return to a previous state. For example, the ECU may control an actuator that is coupled to a trailer to move a ramp of the trailer to the storage position.

As the robot is performing the mission, it may wirelessly provide status updates to the ECU. In that regard, as the ECU receives status updates from the robot, it may provide the status updates to the user via an output device in block 512. The status updates may include prognostic data corresponding to the robot, such as a current power level, whether mobility of the robot has been disrupted or the like. The status updates may also include image data corresponding to the robot, such as image data captured by a camera coupled to the robot. The status updates may also include data indicating a status of each task included in the mission. In some embodiments, the robot may transmit this data to the communication port of the docking station, and the docking station may transmit the data to the ECU.

In block 514, the ECU may monitor the status of the robot and may abort and/or change the mission if necessary. For example, if the ECU determines that the current power level of the robot is no longer sufficient to complete the mission, the ECU may instruct the robot to abort the mission and/or to eliminate tasks from the mission.

In blocks 516, the ECU may receive user input, such as via an input device, corresponding to a user request to change the mission. For example, the user may request an additional task to be performed during the mission, such as for the robot to retrieve an additional grocery item. The ECU may reprogram the robot wirelessly in response to receiving the user request to change the mission.

In some embodiments, the ECU may first ensure that the robot is capable of completing the new task prior to programming the robot to perform the new task. For example, the ECU may ensure that the robot has sufficient battery power to complete the task. If the robot has insufficient battery power to complete the task, the ECU may not program the robot to perform the new task and may inform the user that the new task cannot be completed. At this point, the user may be provided with an option to replace an existing task with the new task.

After the robot has completed its mission, it may notify the ECU that the mission is completed in block 518. In some embodiments, the robot may also or instead notify the ECU when it is within a predetermined distance of the vehicle or the docking station. For example, after completing the mission, the robot may travel towards the vehicle. As the robot approaches the vehicle and is within a predetermined distance, such as 2 feet, 5 feet, 10 feet, 20 feet or the like, the robot may transmit data indicating that the robot is within the predetermined distance. In some embodiments, a sensor of the vehicle may detect that the robot is within the predetermined distance and may provide this data to the ECU.

In response to receiving the notification that the mission has been completed and/or in response to determining that the robot is within a predetermined distance of the vehicle, the ECU may prepare the dock to receive the robot in block 520. For example, if the docking station has changed states after the robot has been undocked (i.e., a ramp has been returned to a storage position) then the ECU may control the docking station to be in a state in which the robot can be docked. For example, the ECU may control an actuator coupled to fingers of a pincher to be in an uncoupled position for receiving the robot. As another example, the ECU may control an actuator coupled to a ramp of a trailer to move the ramp to the loading position.

After the docking station has been prepared to receive the robot, the robot may move into a position where it can be docked to the docking station. For example, the robot may move into an area between the fingers of a pincher of a robot dock. As another example, the robot may roll or walk up a ramp of a trailer onto a platform. After the robot is in the position where it can be docked, the ECU may control the docking station to transition between states. For example, the ECU may control an actuator coupled to fingers of a pincher to move to a coupled position or may control an actuator coupled to a ramp of a trailer to move to a storage position. In some embodiments, a user may be required to manually dock the robot to the docking station. In some embodiments, the ECU may automatically control a lock of the docking station to lock to the robot, and in some embodiments, a user may be required to manually lock the robot to the docking station. In some embodiments, no lock is present and the robot is not locked to the docking station.

In some embodiments, the robot may be automatically coupled to the power port and/or communication port of the docking station when it is docked. For example, when the robot is docked, a connector of the robot may be in contact with a power port and/or a communication port of the docking station, allowing the propagation of power and/or communication signals between the robot and the vehicle. In some embodiments, when the robot is docked, it may be capable of receiving wireless communications or power, such as via inductive charging. Thus, the ECU may determine when the robot has been docked (i.e., corresponding to the robot being electrically and physically coupled to the docking station) and may begin local power transfer to the robot and/or communications with the robot via the docking station in block 522.

Turning now to FIG. 6, a method 600 for controlling power transfer between a robot and a vehicle via a docking station is shown. In block 602, the ECU may determine or predict a route or a route set of the vehicle. Route sets are known in the art and may include a combination of routes. For example, a route set may include a trip from the driver's home to a driver's workplace in the morning, a trip to a restaurant for lunch, and a trip from the driver's workplace to the driver's home in the evening. Route and route set prediction methods and systems are known in the art and will not be described herein.

In block 604, the ECU may determine or predict an amount of power required by the vehicle to complete the route set. For example, the ECU may determine the amount of power required based on the topology of the roads along the route set, the distance of the route set, whether the vehicle can receive additional power at any of the destinations of the route set, the energy efficiency of the vehicle or the like.

In block 606, the ECU may determine or predict missions that will be requested of the robot before the route set is complete. Missions may be determined or predicted based on historical data as well as any data provided to the ECU via the input device. The historical data and/or data provided to the ECU may include predicted or provided destinations along a route set, missions provided to the ECU via the input device, data detected and stored corresponding to previous missions of the robot or the like.

For example, the ECU may determine that a destination of the route set is a grocery store. The ECU may predict that the robot will be requested to retrieve groceries from the grocery store based on the grocery store being a destination and similar missions being requested when previous destinations were grocery stores. As another example, the ECU may store data indicating that the driver typically requests that a particular mission be performed every weekday at noon. The ECU may predict that the same or a similar mission may be performed at noon every weekday.

After determining or predicting the missions that will be requested of the robot in block 606, the ECU may determine or predict the amount of power required to complete the mission in block 608. As described above, this may be based on information such as the particular tasks to be completed, the energy efficiency of the robot, an amount of time required to complete the tasks or the like.

Prior to departing on the route set, the ECU may control the power supply of the vehicle to receive a sufficient amount of power for the vehicle to be able to complete the route set and the robot to be able to complete any missions in block 610. For example, the ECU may control the power supply of the vehicle to receive an amount of power at least as large as the sum of the amount of power required for the vehicle to complete the route set and the power required for the robot to complete the missions.

In some embodiments, the ECU may control the power supply to receive more power than required to complete the route set and the missions. For example, the ECU may control the power supply to receive 10%, 20%, 30% or the like more power than required to complete the route set in missions. This provides sufficient power in case a detour is taken, a mission requires more power than predicted, unexpected missions are requested or the like.

After departing on the route set, the ECU may control the power supply of the vehicle to ensure that the power supply retains sufficient power to complete the route set in block 612. In some embodiments, it may be more critical for the vehicle to be able to complete the route set than for the robot to be able to complete all missions. If the robot is unable to complete all missions, the vehicle may be able to travel to a charging station or other power source to receive additional power for itself and/or for the robot. However, if the vehicle is unable to complete the route set, it may be unable to travel to a charging station or other power source.

In block 612, the ECU may also control the power supply to provide sufficient power to the robot to complete the missions. For example, if 5 kWH are required for the robot to complete a mission and the robot only includes 3 kWH of power, the ECU may control the power supply of the vehicle to provide at least an additional 2 kWH to the robot. In some embodiments, the ECU may control the power supply to provide additional power to the robot, such as 10% above the required amount of power, 20% above the required amount of power or the like.

In some embodiments, if the ECU determines that the power supply of the vehicle does not include sufficient power to complete a route set, the ECU may control the power supply to receive power from the robot. For example, the robot may continuously store a predetermined amount of power. Upon determining that the vehicle cannot complete the route set on the current amount of power in the power supply, the ECU may control the power supply to receive, and/or the robot to provide, at least some of the stored amount of power of the robot.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle for transporting and communicating with a robot comprising:
    a vehicle body;
    a robot dock mechanically coupled to the vehicle body and configured to mechanically couple the robot to the vehicle body;
    a vehicle power source configured to at least one of store or generate power to propel the vehicle;
    an input device configured to receive user input corresponding to a mission to be performed by the robot;
    an input/output port configured to be electrically coupled to the robot; and
    an electronic control unit (ECU) coupled to the input/output port and the power source, and configured to:
        at least partially control the vehicle power source to generate the power to propel the vehicle during movement of the vehicle,
        predict a mission amount of power corresponding to an amount of power to be used by the robot to complete the mission,
        determine a robot charging event when a current battery charge level of a robot battery of the robot is less than the mission amount of power,
        transfer power from the vehicle power source of the vehicle to the robot battery to cause the current power level of the robot battery to reach or exceed the mission amount of power in response to determining the robot charging event,
        transmit the mission to the robot via the input/output port to cause the robot to perform the mission,
        determine or predict a route or a route set to be traveled by the vehicle,
        determine or predict a route amount of power corresponding to an amount of power to be used by the vehicle power source to complete the route or the route set,
        determine a vehicle charging event when the route amount of power is greater than a current vehicle power level of the vehicle power source, and
        transfer at least some power from the robot battery to the vehicle power source in response to determining the vehicle charging event.

2. The vehicle of claim 1 wherein the input/output port includes at least one of a wired port configured to be electrically coupled to the robot when the robot is mechanically coupled to the vehicle body or a wireless port configured to be electrically coupled to the robot when the robot is mechanically coupled to the vehicle body and when the robot is at a location remote from the vehicle.

3. The vehicle of claim 1 wherein the robot dock includes an arm having a pincher configured to extend around at least a portion of a circumference of the robot and a first actuator coupled to the pincher and configured to actuate the pincher between a coupled position in which the pincher resists separation of the robot from the robot dock and an uncoupled position in which the robot is free to move relative to the pincher.

4. The vehicle of claim 3 wherein the robot dock further includes a second actuator coupled to the arm and configured to actuate the arm from a lifted position in which the robot is lifted above a ground surface when the robot is coupled to the robot dock and a grounded position in which the robot is in contact with the ground surface when the robot is coupled to the robot dock.

5. The vehicle of claim 3 wherein the input/output port is coupled to the pincher and configured to be physically connected to the robot when the pincher is in the coupled position.

6. The vehicle of claim 1 wherein the robot dock includes a trailer having at least one wheel configured to support the trailer, a platform configured to support the robot, and a ramp configured to be positioned in a loading position in which the ramp is in contact with a ground surface and the platform and a storage position in which the ramp is separated from the ground surface and still in contact with the platform.

7. The vehicle of claim 6 wherein the trailer further includes an actuator coupled to the ramp and configured to actuate the ramp between the loading position and the storage position.

8. The vehicle of claim 6 further comprising at least one of a convertible cover or a moveable cover configured to at least partially cover the robot when the robot is coupled to the vehicle body.

9. The vehicle of claim 1 wherein the ECU is further configured to at least one of program the robot or control the robot based on the received user input.

10. The vehicle of claim 1 wherein the ECU is further configured to monitor the current battery charge level of the robot battery and to control the vehicle power source to transfer power to the robot battery based on the current battery charge level of the robot battery.

11. A docking station for docking a robot to a vehicle comprising:
    a robot dock configured to be mechanically coupled to a vehicle body of the vehicle and to the robot;

a communication port coupled to the robot dock and configured to be electrically coupled to an electronic control unit (ECU) of the vehicle, to be electrically coupled to the robot, to transmit a signal from the ECU to the robot to at least one of program the robot or control the robot, and to transmit a current battery charge level of a robot battery of the robot to the ECU of the vehicle, the ECU being configured to:
predict a mission amount of power corresponding to an amount of power to be used by the robot to perform a mission,
determine a robot charging event when the current battery charge level of the robot battery is less than the mission amount of power,
determine or predict a route or a route set to be traveled by the vehicle,
determine or predict a route amount of power corresponding to an amount of power to be used by the vehicle power source to complete the route or the route set,
determine a vehicle charging event when the route amount of power is greater than a current vehicle power level of the vehicle power source, and
control a vehicle power source to generate power to propel the vehicle; and
a power port coupled to the robot dock and configured to be electrically coupled to a vehicle power source of the vehicle that is used to propel the vehicle, to be electrically coupled to the robot battery, and to facilitate power transfer from the vehicle power source to the robot battery in response to the robot charging event and to facilitate power transfer of at least some power from the robot battery to the vehicle power source in response to the vehicle charging event.

12. The docking station of claim 11 wherein the robot dock includes an arm having a pincher configured to extend around at least a portion of a circumference of the robot and a first actuator coupled to the pincher and configured to actuate the pincher between a coupled position in which the pincher resists separation of the robot from the robot dock and an uncoupled position in which the robot is free to move relative to the pincher.

13. The docking station of claim 11 wherein the robot dock includes a trailer having at least one wheel configured to support the trailer, a platform configured to support the robot, and a ramp configured to be positioned in a loading position in which the ramp is in contact with a ground surface and the platform and a storage position in which the ramp is separated from the ground surface and still in contact with the platform.

14. The docking station of claim 13 wherein the trailer further includes an actuator coupled to the ramp and configured to actuate the ramp between the loading position and the storage position.

15. The docking station of claim 13 further comprising at least one of a convertible cover or a moveable cover configured to at least partially cover the robot when the robot is coupled to the vehicle body.

16. The docking station of claim 11 wherein the robot dock is configured to be mechanically coupled to the vehicle body via a trailer hitch of the vehicle.

17. A method for controlling a robot by a vehicle comprising:
at least partially controlling, by an electronic control unit (ECU) of the vehicle, a power source of the vehicle to generate power to propel the vehicle during movement of the vehicle;
receiving, by an input device of the vehicle, user input corresponding to a request for the robot to perform a mission;
predicting, by the ECU, a mission amount of power corresponding to an amount of power to be used by the robot to complete the mission;
determining, by the ECU, a robot charging event when a current robot battery charge level of a robot battery of the robot is less than or equal to the mission amount of power;
controlling, by the ECU, the vehicle power source of the vehicle to transfer power to the robot battery based on the robot charging event;
programming, by the ECU, the robot to perform the mission;
instructing, by the ECU, the robot to begin performing the mission;
determining or predicting, by the ECU, a route of the vehicle;
determining or predicting, by the ECU, a route amount of power corresponding to an amount of power that the vehicle power source will use to complete the route;
determining, by the ECU, a current vehicle amount of power stored in the vehicle power source of vehicle;
determining, by the ECU, a vehicle charging event when the current vehicle amount of power is less than the route amount of power; and
controlling, by the ECU, the robot to transfer at least some power from the robot power source to the vehicle power source in response to determining the vehicle charging event.

18. The method of claim 17 further comprising:
monitoring, by the ECU, a status of the robot;
displaying, by an output device of the vehicle, the status of the robot;
receiving, by the input device of the vehicle, additional user input corresponding to a desired change in the mission; and
controlling, by the ECU, the robot to change the mission based on the additional user input.

* * * * *